(12) United States Patent
Bedetti

(10) Patent No.: US 6,957,502 B2
(45) Date of Patent: Oct. 25, 2005

(54) FLUID BED GRANULATION APPARATUS

(75) Inventor: Gianfranco Bedetti, Milan (IT)

(73) Assignee: Urea Casale S.A. (CH)

( * ) Notice: Subject to any disclaimer, the term of this patent is extended or adjusted under 35 U.S.C. 154(b) by 0 days.

(21) Appl. No.: 10/474,119

(22) PCT Filed: Apr. 12, 2002

(86) PCT No.: PCT/EP02/04101

§ 371 (c)(1),
(2), (4) Date: Oct. 7, 2003

(87) PCT Pub. No.: WO02/083320

PCT Pub. Date: Oct. 24, 2002

(65) Prior Publication Data

US 2004/0111915 A1 Jun. 17, 2004

(30) Foreign Application Priority Data

Apr. 13, 2001 (EP) .............................. 01109204

(51) Int. Cl.$^7$ ............................................. F26B 17/00
(52) U.S. Cl. .............................. 34/582; 34/585; 34/147
(58) Field of Search .............................. 239/590, 590.5; 23/313 FB; 34/314, 360, 369, 372, 373, 374, 582, 585, 59, 58, 147

(56) References Cited

U.S. PATENT DOCUMENTS

| | | | |
|---|---|---|---|
| 3,735,792 A | * 5/1973 | Asizawa et al. | ............ 159/4.04 |
| 3,795,057 A | * 3/1974 | Fanaritis | ........................ 34/360 |
| 4,353,709 A | * 10/1982 | Nioh et al. | ............. 23/313 FB |
| 4,501,773 A | * 2/1985 | Nioh et al. | .................. 427/213 |
| 4,625,916 A | 12/1986 | Nieuwkamp et al. | |
| 4,701,353 A | 10/1987 | Mutsers et al. | |
| 4,773,597 A | 9/1988 | Dittrich et al. | |
| 5,632,102 A | 5/1997 | Luy et al. | |
| 5,934,555 A | 8/1999 | Döbbeling et al. | |
| 6,096,839 A | 8/2000 | Chinh et al. | |

FOREIGN PATENT DOCUMENTS

EP 0 205 739 A1 12/1986

* cited by examiner

Primary Examiner—Kenneth Rinehart
(74) Attorney, Agent, or Firm—Akerman Senterfitt

(57) ABSTRACT

A nozzle for distributor devices of granule's growth liquid substance in fluid bed granulators, is distinguished by the fact that it comprises a duct (2) having, at one end, at least one inlet opening (3) for a flow (F) of a chosen granule's growth liquid substance, and, at the other end, a supply opening (5) for such substance, a gaseous flow distributor (6) externally associated to the duct (2) in predetermined spaced relationship from the supply opening (5) and in fluid communication with the inside of the duct (2), and emulsifying means (8) associated to the inlet opening (3) and the distributor (6) to obtain, inside the duct (2), an emulsion of the gaseous flow in the growth liquid substance.

6 Claims, 2 Drawing Sheets

FLUID BED GRANULATION APPARATUS

FIELD OF APPLICATION

In its most general aspect, the present invention relates to an apparatus for fluid bed granulation processes where granules of a chosen substance are obtained through continuous growth (of both volume and mass) of granules and seeds of that substance suspended in a fluid bed, by means of a suitable growth substance in the fluid state, continuously fed in said fluid bed.

Particularly, this invention concerns a granulation apparatus comprising a container, wherein a fluid bed of seeds and granules of the chosen substance to be granulated is obtained, a device for feeding continuously said seeds in said fluid bed, a fluidification and support system of the fluid bed and at least a distributor of a flow of the growth liquid, comprising a plurality of nozzles for supplying said liquid.

More particularly, this invention relates to a supplying nozzle for the granule-growth liquid substance, usable for granulation apparatus of the above kind.

In the following description and attached claims, such apparatus will be generally addressed as granulator, while the expression: "granule's seed of a chosen substance", is generally meant to indicate particles of the substance to be granulated having dimensions equal or less than about 1.5 mm in diameter. Furthermore, to simplify, the term "seeds" will be used to indicate the granule's seeds.

PRIOR ART

It's known that to reach a good granulation outcome (prearranged granule's dimension, shape and mass) with a fluid bed process of the above type, a good "wetting" of both the seeds and the growing granules by the growth liquid is required. And, to this end, the growth liquid must be fed to the fluid bed in the form of the least possible droplets, certainly less than the seeds and the growing granules, which said droplets are to get in touch with. That's to allow, as for example with the urea, the evaporation of water or different solvent contained in the growth liquid (solution of urea), in the fastest and most complete possible way, so as to obtain a high purity final product (granules).

From this point of view, the dimension of the growth liquid droplets is so crucial that it's very advantageous, if not necessary, to feed said growth liquid in the so-called "atomized" form. In this condition, actually, the growth liquid is able to get in touch one by one with all the seeds or granules suspended in the fluid bed, and to wet evenly and in an optimal way their whole surface.

In order to atomize the growth liquid, the prior art granulators and, more specifically, their growth liquid supplying devices, make use of specific atomizing nozzles fed with said liquid and at the same time with large amounts of air (or other suitable gas) at high speed. Such speed is, for example, when considering urea granulation, comprised between 150 m/s and 300 m/s, with an air/liquid substance ratio typically comprised between 0.4 and 0.5 (that is 400–500 Kg of air against 1000 Kg of liquid substance).

But, although largely used and being advantageous under some points of view, the use of the atomizing nozzle of the above mentioned type causes known drawbacks not yet overcame in the fluid bed granulation processes of the prior art. Actually, the need to work with large amounts of air (or other gas) at high speed prevents a control of the granule growth inside the fluid bed and, consequently, leads to the inability to control the final product granulometry between predetermined limited values. This entails expensive classification and screening operations of the produced granules, the recovery of granules of unacceptable size (too big or too little), and their recycle upstream to the granulation process.

Furthermore, feeding large amounts of atomizing air (or other suitable gas) at high pressure to obtain the above-mentioned speed gives rise to such extremely high consumption of energy that the production costs of the granules are substantially affected.

SUMMARY OF THE INVENTION

The problem underlying the present invention is to devise and to make available a nozzle for distribution devices of growth liquid substance in fluid bed granulators, having structural and functional features in order to obtain the following goals.

First, said growth liquid substance should be made available in a suitable form to obtain a good granulation product by using amounts of air (or other suitable gas) much reduced with respect to what is currently possible. Second, said growth liquid substance should be supplied with speeds so low as to overcome all the cited drawbacks linked to the prior art.

The idea of solution underlying the present invention is to make available a nozzle able to carry out a dispersion of air (or other suitable gas) into the growth liquid substance, which is to say an emulsion of the gaseous phase into the liquid phase. It should be pointed out that this is in clear contradiction with the teaching of the prior art that makes use of atomizing nozzles to disperse the growth liquid substance into the gaseous flow.

The above technical problem is thereby solved according to the invention, by a nozzle of the above-mentioned type, characterized by the fact that it comprises a duct having, at one end, at least one inlet opening for a flow of a chosen granule's growth liquid substance, and, at the other end, a supply opening for such substance, a gaseous flow distributor externally associated to said duct in predetermined spaced relationship from said supply opening and in fluid communication with the inside of said duct, and emulsifying means associated to said inlet opening and said distributor to obtain, inside said duct, an emulsion of said gaseous flow in said growth liquid substance.

Preferably, the emulsifying means include a swirling device located inside the duct between said at least one input opening and said distributor, the swirling device being able to impart a helical motion to an axial flow of the growth liquid substance inside the duct.

A first important advantage achieved by the present invention is the fact that the possibility to obtain, through the nozzle according to the invention, a gas-in-liquid emulsion, allows to have the growth liquid substance in the form of a very thin film, coating minute bubbles of air (or other gas). The minute bubbles, colliding with the seeds or the growing granules inside the fluid bed, break and so the growth liquid film sticks on said particles, thereby obtaining a growth of the same that is equivalent to the growth achieved with the prior art atomized droplets. Yet, that growth is obtained with a drastic reduction of the quantity (volumes) of the gaseous flow (air or other suitable gas) as compared to the prior art, with a gas/growth liquid substance ratio even reduced between 0.002 and 0.01 (i.e. 2–10 Kg of gas for 1000 Kg of liquid substance).

Another important advantage is represented by the likewise drastic reduction in the supplying speed of said emulsion. The speed is now determined by the liquid flow speed, typically between 2 and 60 m/s.

As an immediate consequence there is the concrete possibility to feed such emulsion to the fluid bed granulator with a very low speed compared to what happens with the prior art atomizing nozzles. This carries the double advantage of lowering the consumption of energy and of controlling the granule's growth inside the fluid bed, controlling, as a consequence, the granulometry of the final product.

In fact, the low amounts of air (or other gas) requested for operating the nozzle, according to the present invention, allow to operate with insignificant energy consumption if compared with the prior art, to the benefit of the granule's production costs.

Furthermore, the low feeding speed allows to limit the final product granulometry inside a predetermined range of values, which is much narrower if compared to the prior art. This because it is surprisingly possible to control the seeds and granules whirling motion inside the fluid bed granulator, and therefore to control their growth.

The advantages and the features of the invention will be better shown from the description of an illustrative and non limiting embodiment of the invention, made hereinafter with reference to the enclosed drawings

SHORT DESCRIPTION OF THE DRAWINGS

DETAILED DESCRIPTION

Figure 1:
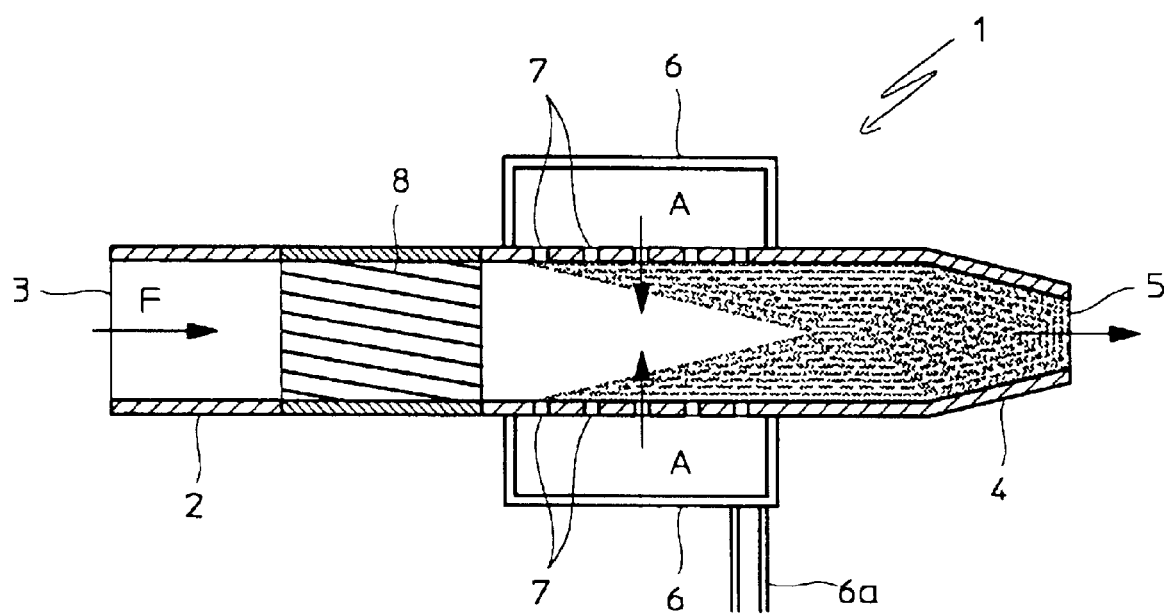
FIG. 1 shows schematically and in longitudinal section a nozzle for growth liquid distributor devices in fluid bed granulators, according to the present invention.

With reference to FIG. 1, with 1 a nozzle according to the present invention is globally indicated, which is particularly suitable for supplying a chosen granule's growth liquid substance in fluid bed granulators.

Said nozzle comprises a duct 2, preferably cylindrical, provided, at one end, with an opening 3, for the inlet of a continuous flow of said growth liquid and, at the other end, with a portion 4, conically tapered towards an opening 5, for supplying said liquid substance.

At a predetermined distance from said liquid supplying opening 5, a distributor device 6 for an air or other gas flow A is mounted on the duct 2. The device 6 is in fluid communication with the inside of said duct trough a plurality of openings 7 (for example holes or slits), made out from the same duct wall and preferably oriented in radial direction. On the other side, said distributor device 6 is in communication, trough a duct 6a, with a source of, for example, pressured air, which is not represented since conventional.

In a position between opening 3 and said distributor device 6, a swirling device 8 (of the type for example with fixed helical vanes) is mounted inside duct 2 as emulsifying means. Said swirling device is able to set in helical motion a liquid flux F, fed axially in said duct 2 through opening 3 with rectilinear feed motion.

A nozzle according to the present invention, during a fluid bed granulation process, works as follows.

Two continuous flows are fed inside duct 2 at the same time: a granule's growth liquid flow F, through opening 3, and an air flow A, through the distributor's 6 plurality of openings 7.

As mentioned above, the air/growth liquid ratio may vary between 0.002 and 0.01.

When traversing the swirling device, the substantially rectilinear liquid flux F is set in rotational motion, so that, downstream from said swirling device 8, said flow's motion is helical. This helical motion has axial feed speed substantially equal to that in the duct stretch downstream from the swirling device 8 and a predetermined tangential speed such that a gas in liquid emulsion can be generated as described hereinafter.

Depending on the granulation type to be obtained, the feed speed of the growth substance flow is for example comprised between 2 and 60 m/s, while the tangential speed is for example comprised between 2 and 30 m/s.

And, downstream from the swirling device 8, at these predetermined tangential speeds, the impact between the growth liquid flow and the air flow, continuously blown through the distributor 6, takes place. As a consequence, the air is subjected to a very fast splitting in minute bubbles that, maintaining their individuality, penetrate through the growth liquid mass under the effect of centripetal forces due to said tangential motion of the liquid mass. Essentially, the formation of an emulsion of air in said growth liquid substance takes place.

When considering urea granulation, it was for instance surprisingly noted that with a feed speed of the growth liquid substance, comprised between the above-mentioned values, 50–200 micron bubbles (air in liquid) were obtained; said bubbles were coated by a very thin film of said liquid substance, with thickness comprised for example between 1 and 10 micron.

In the portion of duct 2 comprised between where the emulsion is formed and the supplying opening 5, the bubble flow gradually gains compactness, with bubbles uniformly spread in its cross-section and with feed speed, for example, substantially equal to that of the liquid flow at the inlet in duct 2.

This flow of minute bubbles coated by the very thin growth liquid film, obtained with very small air consumption (as to what was until now possible for the same substance atomization), is supplied through the opening 5 in, for example, a fluid bed of growing seeds and granules, with a very reduced speed if compared to that currently set by the prior art.

Figure 2:
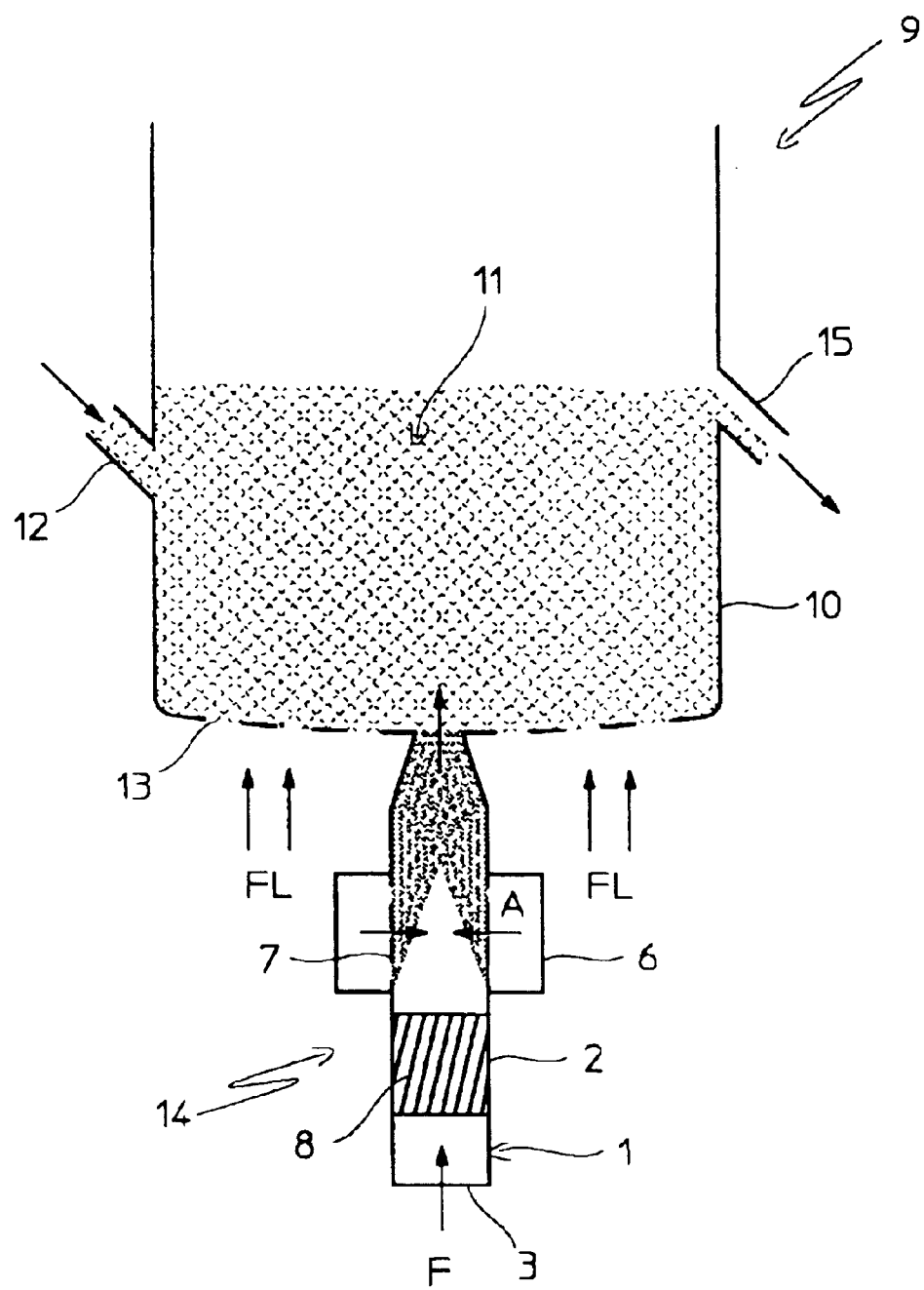
FIG. 2 shows schematically and in cross section a fluid bed granulation apparatus comprising the nozzle of FIG. 1, according to the present invention.

With reference to FIG. 2, a fluid bed granulation apparatus (or granulator) according to the present invention, globally indicated with 9, is very schematically and partially represented.

In that figure, details structurally and functionally equivalent to those represented in the previous figure will be indicated with the same reference numbers and will be no further described.

Granulation apparatus 9 comprises a container 10, wherein a fluid bed 11 of seeds and granules of the chosen substance to be granulated is obtained, a device for feeding continuously said seeds in said fluid bed (duct 12), a fluidification and support system of the fluid bed (perforated bottom 13 and blowing means—not represented since conventional—of fluidification air or other gaseous fluid FL) and at least a distributor device 14 for the granule's growth liquid flow F. The apparatus 9 is also provided of a device (duct 15) for the weir discharge of the final product.

Advantageously, distributor device 14 includes one (as in the example of FIG. 2) or more growth liquid supplying nozzles 1, of the described type with reference to FIG. 1.

The invention thus conceived may be susceptible to variations and modifications, all falling within the scope of protection defined in the following claims.

For instance, instead of the swirling device 8, emulsifying means may be obtained by positioning the openings 7 as to the axis of duct 2 in a suitable manner (for example tangential to it), so to obtain a tangential gaseous flow feeding with respect to the growth liquid flow. This tangential gaseous flow, supported by a predetermined feeding speed, imparts said helical motion to the liquid flow.

According to a further embodiment of the present invention, the openings 7 in FIG. 1, positioned in radial direction as regards the axis of duct 2, can act as emulsifying means, should said gaseous flow be sent through said openings with suitable and predetermined feeding speed.

Furthermore, depending on the volume of air or other gas to be fed in the liquid flow, duct 2 may have a sole opening 7, suitably dimensioned.

Finally, the portion 4 of duct 2 can be manufactured as substantially rectilinear or tapered toward the outside; so the swirling device 8 can be of dynamic type, for example a turbine.

What is claimed is:

1. A nozzle for distributor devices for a granule growth liquid substance in fluid bed granulators, comprising:
   a duct having, at one end, at least one inlet opening for a flow of a chosen granule's growth liquid substance, and, at the other end, a supply opening for said substance;
   a gaseous flow distributor externally associated to said duct in predetermined spaced relationship from said supply opening and in fluid communication with the inside of said duct; and
   emulsifying means associated to said inlet opening and said distributor to obtain, inside a cylindrical portion of said duct, an emulsion of said gaseous flow in said growth liquid substance.

2. Nozzle according to claim 1, wherein said emulsifying means comprise a swirling device located inside said duct between said at least one inlet opening and said distributor, said swirling device being able to impart a helical motion to an axial flow of said growth liquid substance inside said duct.

3. Nozzle according to claim 1, wherein said gaseous flow distributor is in fluid communication with the inside of said duct through at least one opening in a wall of said duct.

4. Apparatus according to claim 1, wherein said gaseous flow distributor is in fluid communication with the inside of said duct through at least one opening in a wall of said duct.

5. A fluid bed granulation apparatus, comprising:
   a container in which a fluid bed of seeds and granules of a chosen substance to be granulated is obtained;
   a device for feeding continuously said seeds in said fluid bed;
   a fluidification and support system of the fluid bed; and
   at least one distributor device for a flow of a granule growth liquid substance,
   wherein said distributor device comprises at least one supplying nozzle for said granule growth liquid substance, comprising a duct having, at one end, at least one inlet opening for a flow of said liquid substance, and, at the other end, a supply opening for said substance,
   a gaseous flow distributor externally associated to said duct in predetermined spaced relationship from said supply opening and in fluid communication with the inside of said duct, and
   emulsifying means associated to said inlet opening and said gas flow distributor to obtain, inside a cylindrical portion of said duct, an emulsion of said gaseous flow in said growth liquid substance.

6. Apparatus according to claim 5, wherein said emulsifying means comprise a swirling device located inside said duct between said at least one inlet opening and said distributor, said swirling device being able to impart a helical motion to an axial flow of said growth liquid substance inside said duct.

* * * * *